W. SCHOPPER.
ORE LEACHING.
APPLICATION FILED SEPT. 24, 1921.

1,417,947.

Patented May 30, 1922.
2 SHEETS—SHEET 2.

Walter Schopper
Inventor:
by his attorneys
Pennie, Davis, Marvin & Edmonds

UNITED STATES PATENT OFFICE.

WALTER SCHOPPER, OF FRANKFORT-ON-THE-MAIN, GERMANY, ASSIGNOR TO METALLBANK UND METALLURGISCHE GESELLSCHAFT, AKTIENGESELLSCHAFT, OF FRANKFORT-ON-THE-MAIN, GERMANY, A CORPORATION OF GERMANY.

ORE LEACHING.

1,417,947. Specification of Letters Patent. Patented May 30, 1922.

Application filed September 24, 1921. Serial No. 503,025.

*To all whom it may concern:*

Be it known that I, Dr. WALTER SCHOPPER, a citizen of the German Republic, residing at Bockenheimer Anlage 45, Frankfort-on-the-Main, Germany, have invented certain new and useful Improvements in Ore Leaching (for which I have filed application in Germany May 30, 1919, Nr. 65857 VI 40$^a$), of which the following is a specification.

The present invention relates to a process for the continuous leaching of ores, metallurgical products and other materials on the counter-current principle.

Numerous proposals have already been made for treating ores and metallurgical products with water, acid or alkali by mechanical means, and in continuous manner, on the counter-current principle. In most cases several of such devices are arranged in series. The extracting liquid enters the last section of the device from which the ore is discharged, passes continuously through the individual sections provided and runs off at the charging end of the device in the form of more or less saturated liquor.

A difficulty that has been encountered in such continuous leaching devices consists in that it frequently occurs that the low-gravity liquor coming from a previous section of the leaching device does not sufficiently mix with the liquor of greater specific gravity, found for example, in the last section of the leaching device. The low-gravity liquor flows on the surface of the denser liquor and thus leaves the device, without being completely utilized or without having attained the required strength.

According to the present invention this difficulty is avoided by using a reciprocating device which at first moves the ore and liquor in the forward direction. This movement causes the level of the liquor to sink. When the conveying device moves backwards the ore remains in position, but the liquid flows back and consequently rises above the level it occupied while stationary, and thus passes over from the first leaching vessel into the second. This surging flow of the liquor from one leaching vessel to the next prevents the formation of layers of liquid of low specific gravity overlying a solution of greater specific gravity, the oncoming solution being immediately mixed with the liquid already present.

Figure 1:
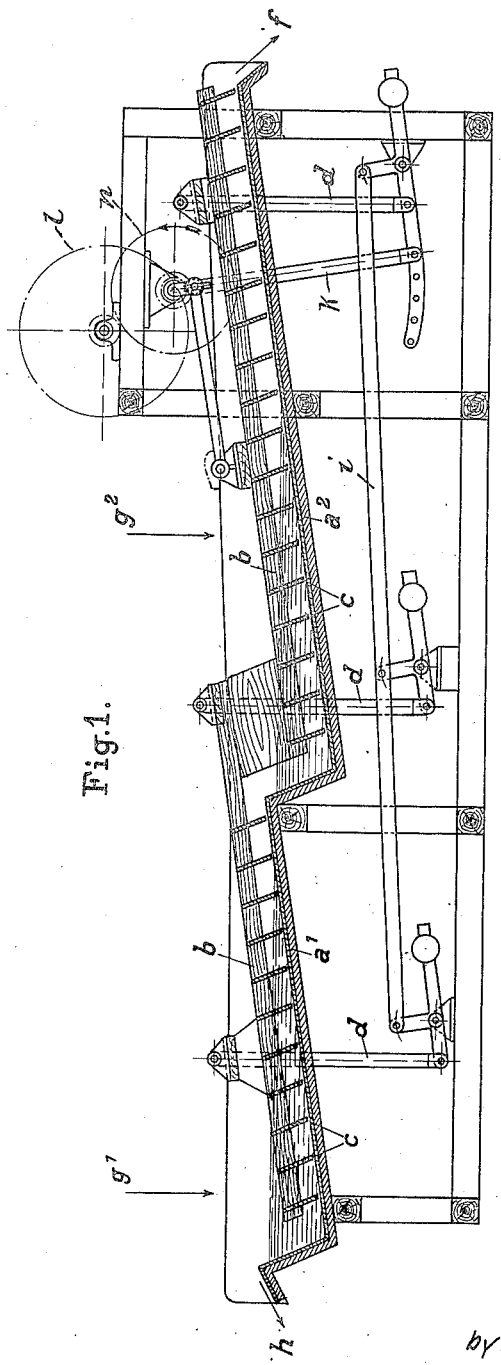
Figure 2:
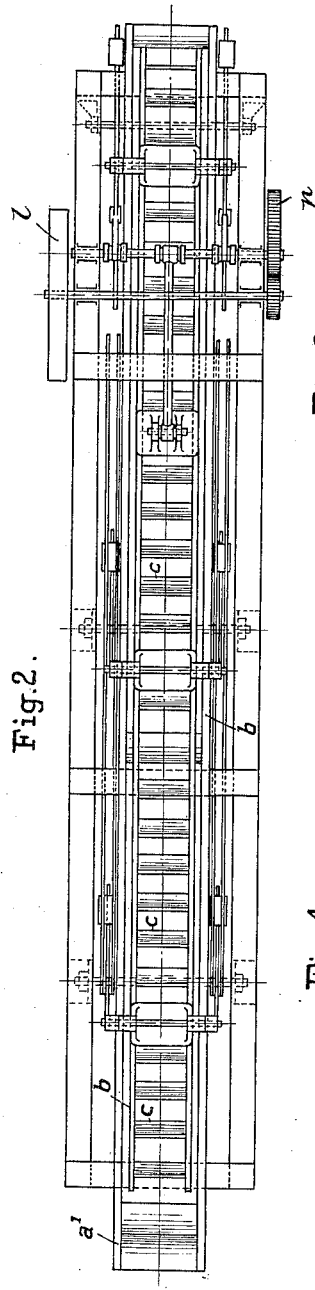
Figure 3:
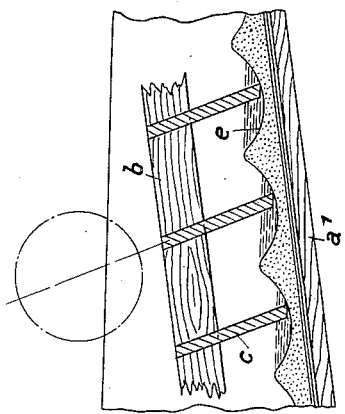
Figure 4:
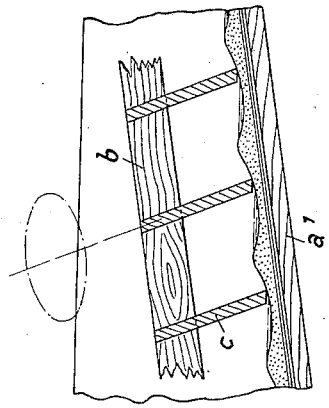

The invention will be more clearly understood after a study of the accompanying drawings, in which Fig. 1 is a vertical longitudinal section through a leaching apparatus constructed and operating in accordance with this invention; Fig. 2 is a plan of such apparatus; Fig. 3 is an enlarged detail showing the action of the feeding device when it follows a circular path in its reciprocatory motion; and Fig. 4 is a view similar to Fig. 3, but showing the action when the device moves in an elliptical path. The apparatus shown in these drawings comprises a series of separate leaching troughs $a'$, $a^2$, both triangular in longitudinal section. The movement of the ore or other material to be treated is effected by means of a series of beams $b$ to which are fixed transverse blades or rakes $c$. These beams are suspended on levers $b$ and are made to describe an elliptical path, forward along the bottom of the vessels $a'$ $a^2$ up and back again. This elliptical movement is effected through links $i$, $k$ and bell crank levers $m$, power being supplied from pulley $l$ through gears $n$. The material to be treated is introduced into the trough $a'$ at $g'$ and is fed toward the right until finally discharged at $f$. The extracting liquor is introduced into the trough $a^2$ at $g^2$ and is moved toward the left until it overflows at $h$. The ore and liquid consequently act upon each other on the countercurrent principle.

The reciprocating movement of the paddle beam is preferably elliptical. If it is circular the ore covering the bottom of the leaching vessel would assume a peculiar contour, shown in Fig. 3. These small hollow spaces $e$ would be filled with liquid which would be carried from the trough simultaneously with the ore, which is undesirable. With an elliptical movement the material in the bottom of the leaching vessel assumes quite a different contour as shown in Fig. 4 and the liquor and ore are not moved together. Moreover, it is of great importance that the number of the movements of the beam per minute should be suitably chosen, so that a regular rise and fall of the liquid in each individual receptacle is produced. Fifteen movements of the beam per minute form a suitable number.

The carrying out of the process on a large scale has shown that for example in leaching zinc ores with sulphuric acid perfectly neutral highly concentrated liquors are obtained with certainty, and that there is no risk of acid liquors which have not come sufficiently into contact with the ore, passing over.

The capacity of the above described construction is exceedingly high. A series of leaching troughs 35 centimetres wide and 12 metres long can leach 1000 kilogrammes of ore, containing 20% of zinc per hour. Other constructions for the same purpose having a width of 1.2 metres and a length of 13 metres, are reported as treating only 60 to 75 kilos of ore per hour (see "Metall & Erz" 1919, page 141).

What I claim is:

1. An apparatus for the continuous leaching of ores and the like on the countercurrent principle, comprising the combination of a series of leaching vessels unconnected except at their adjacent edges, means for flowing extracting liquor through the leaching vessels, reciprocating rakes designed to move the ore from one leaching vessel to the next in one direction, and surge the extracting liquor from one vessel to the next in the opposite direction.

2. An apparatus for the continuous leaching of ores and the like on the countercurrent principle, comprising the combination of a series of leaching vessels, reciprocating racks designed to move in an elliptical path and feed the ores from one leaching vessel to the next in one direction and surge extracting liquor from one vessel to the next in the opposite direction.

3. A process for continuously leaching ores and the like on the countercurrent principle in an apparatus having a series of leaching vessels, comprising moving the ore through the vessels in one direction and surging the extracting liquor from one vessel to the next in the opposite direction.

In testimony whereof I affix my signature in presence of two witnesses.

DR. WALTER SCHOPPER.

Witnesses:
F. HOSTELORINS,
ROBERT ENGLER.